US007818958B2

(12) United States Patent  
Bulin et al.

(10) Patent No.: US 7,818,958 B2
(45) Date of Patent: Oct. 26, 2010

(54) JET ENGINE NACELLE FOR AN AIRCRAFT AND AIRCRAFT COMPRISING SUCH A NACELLE

(75) Inventors: Guillaume Bulin, Blagnac (FR); Patrick Oberle, Verdun sur Garonne (FR); Thierry Surply, Cornebarrieu (FR)

(73) Assignee: Airbus France, Toulouse (FR)

( * ) Notice: Subject to any disclaimer, the term of this patent is extended or adjusted under 35 U.S.C. 154(b) by 22 days.

(21) Appl. No.: 12/443,343

(22) PCT Filed: Sep. 28, 2007

(86) PCT No.: PCT/FR2007/001595
§ 371 (c)(1),
(2), (4) Date: Mar. 27, 2009

(87) PCT Pub. No.: WO2008/040869
PCT Pub. Date: Apr. 10, 2008

(65) Prior Publication Data
US 2010/0044503 A1 Feb. 25, 2010

(30) Foreign Application Priority Data
Sep. 29, 2006 (FR) .................................. 06 08547

(51) Int. Cl.
*F02K 3/04* (2006.01)
(52) U.S. Cl. ........................... 60/226.1; 60/262; 60/771; 239/265.27
(58) Field of Classification Search ................ 60/226.1, 60/226.2, 226.3, 262, 263, 771; 239/265.23, 239/265.27, 265.29, 265.31; 244/53 R, 130; 415/914
See application file for complete search history.

(56) References Cited

U.S. PATENT DOCUMENTS 3,779,010 A * 12/1973 Chamay et al. ............ 60/226.2

(Continued)

FOREIGN PATENT DOCUMENTS

EP 0 315 524 5/1989

(Continued)

OTHER PUBLICATIONS

U.S. Appl. No. 12/521,869, filed Jul. 1, 2009, Bulin, et al.

*Primary Examiner*—Louis Casaregola
(74) *Attorney, Agent, or Firm*—Oblon, Spivak, McClelland, Maier & Neustadt, L.L.P.

(57) ABSTRACT

A nacelle for an aircraft high-bypass jet engine, in which a jet engine having a longitudinal axis is mounted, the nacelle including a wall concentrically and at least partially surrounding the jet engine and defining with the latter an annular duct for fluid inner flow, including at the downstream end of the nacelle wall a passage section of a flow outlet. The nacelle includes a displacement mechanism displacing on request a portion of the nacelle wall to modify the passage section of the flow outlet through which a major portion of the flow escapes, the displacement forming in the nacelle wall at least one opening through which a small portion of a leak flow, naturally escapes. The nacelle further includes a fluid device that uses a fluid for compelling the leak flow to flow along the outer face of the portion of the nacelle wall located downstream relative to the at least one opening.

14 Claims, 2 Drawing Sheets

U.S. PATENT DOCUMENTS

| | | | |
|---|---|---|---|
| 3,820,719 A | 6/1974 | Clark | |
| 3,885,891 A | 5/1975 | Throndson | |
| 4,047,381 A * | 9/1977 | Smith | 60/226.2 |
| 4,922,713 A | 5/1990 | Barbarin et al. | |
| 2005/0103933 A1 | 5/2005 | Lair | |
| 2008/0118348 A1 * | 5/2008 | Alecu | 415/144 |

FOREIGN PATENT DOCUMENTS

FR    2 184 021    12/1973

* cited by examiner

JET ENGINE NACELLE FOR AN AIRCRAFT AND AIRCRAFT COMPRISING SUCH A NACELLE

The invention relates to an aircraft engine nacelle equipped with a variable nozzle system.

Variable nozzle systems were initially developed for military aeronautical applications.

These systems permit a significant improvement in the thermodynamic performances of a turbojet.

Traditionally, turbojets installed on airliners are not equipped with a variable nozzle system.

In fact, the traditional variable nozzle systems impose very severe dimensioning constraints, which are directly related to the perimeter of the nozzle whose cross section must be modified.

As it happens, turbojets with which airliners are equipped are characterized by substantially high bypass ratios of between 4 and 8, thus necessitating relatively large nozzle diameters.

For this reason the integration of traditional variable nozzle systems in airliners poses the risk of significantly increasing the complexity and weight of the engine nacelle while at the same time reducing the aerodynamic properties of the propulsion assembly, which is unacceptable.

The object of the present invention is an aircraft engine nacelle having high bypass ratio, wherein there is installed an engine with longitudinal axis, the nacelle having a wall that concentrically surrounds the engine at least partly and that defines therewith an annular internal fluid flow conduit, which at a so-called downstream end of the nacelle wall has a flow-outlet passage cross section, characterized in that the nacelle is equipped with means for displacement, on command, of a part of the nacelle wall in order to vary the flow-outlet passage cross section via which the major part of the flow escapes, this displacement creating, in the nacelle wall, at least one aperture via which there naturally escapes a small part of the flow, known as leakage flow, the nacelle being provided with a fluid-control device that causes a fluid to force the leakage flow to pass along the external face of the part of the nacelle wall situated downstream from the said at least one aperture.

By varying the outlet passage cross section of the flow by displacement of part of the nacelle wall, there is achieved in simple and lightweight manner a nozzle of variable cross section in a turbojet with high bypass ratio and even very high bypass ratio.

In addition, the fluid-control device makes it possible to channel all or part of the leakage flow along the external face of the nacelle wall by using another fluid flow and thus make this leakage flow adhere to the wall.

The channeling of this leakage flow by the other fluid flow therefore does not necessitate a supplementary mechanical device in addition to that making it possible to displace the downstream wall part of the nacelle.

The flow substantially redirected in this way, coparallel to the thrust vector, contributes to the engine thrust and therefore increases the efficiency of the engine equipped with a variable nozzle system.

It will be noted that the purpose of the invention is not to prevent the leakage flow, which arises during the creation of an aperture or apertures in the wall, but to control this flow, in particular its direction, so that it contributes to the engine thrust.

By guiding this flow there is achieved a significant reduction in aerodynamic losses: the turbulence phenomena are greatly reduced and even canceled out, thus diminishing the drag. The aerodynamic performances of the propulsion unit are therefore improved.

In the case of a turbojet with high bypass ratio, the diameter of the fan is very large, so that the variation of the flow-outlet passage cross section that can be achieved is sufficiently large to have a strong effect on the fan behavior. The efficiency of the propulsion system is then increased during each flying phase.

Furthermore, the adaptation of a variable nozzle system on turbojets installed in airliners makes it possible to reduce, in low-speed flying phases (takeoff, approach and landing), the velocities of ejection of air downstream from the turbojet, with a commensurate reduction in associated noise emissions. This advantage is a determining parameter in the current aeronautical context, where acoustic constraints upon airliners are becoming increasingly more drastic.

A variable nozzle system therefore exhibits clear advantages in terms of aerodynamic and thermodynamic performances when it is integrated in a turbojet with high or even very high bypass ratio.

According to one characteristic, the fluid-control device is equipped with means for injection of a high-energy fluid into the leakage flow.

This fluid-control device is simple and efficient, since it relies not on movable mechanical means but on fixed fluid injection means, and the energy used can be obtained from the nacelle itself (example: pressurized air coming from the engine).

At least one of the thermodynamic and aerodynamic parameters of the injected fluid makes it possible to control the direction imparted to the leakage flow and the magnitude of the leakage flow affected by this reorientation.

It will be noted that the same thermodynamic and aerodynamic parameter or parameters may be used to control both the orientation of the leakage flow and the fraction of the said flow that is oriented in this way.

According to one characteristic, the fluid-control device is equipped with at least one nozzle for injecting a high-energy fluid into the leakage flow.

According to one characteristic, the said at least one injection nozzle has an annular or semi-annular shape.

According to one characteristic, the said at least one injection nozzle communicates with a fluid supply duct that is arranged at least partly in the nacelle wall.

According to one characteristic, the injection of fluid is effected in continuous or pulsed manner.

According to one characteristic, the device has a curved surface, disposed tangentially at the discharging end of the injection means, in such a way as to direct the leakage flow along the external face of the downstream part of the nacelle wall.

The curved (convex) surface makes it possible to divert the high-energy fluid injected tangentially to this surface.

According to one characteristic, the injection means are mounted on the external face of the nacelle wall.

According to one characteristic, the fluid-control device is mounted upstream from the aperture or apertures.

According to one characteristic, the fluid-control device is mounted downstream from the aperture or apertures.

According to one characteristic, the part of the nacelle wall situated downstream from the said at least one aperture comprises a profiled leading edge.

According to one characteristic, at the interior of the annular conduit, the engine has an external face and the displaceable part of the nacelle wall has an internal face, that cooperate with one another to cause variation of the flow-outlet passage cross section when the said wall part is displaced.

According to one characteristic, the displaceable part of the nacelle wall is a downstream part of this wall that includes the trailing edge thereof and that is capable of being displaced longitudinally along the annular conduit, by translation in the downstream direction, between a first position, in which no aperture is created, and a second position, in which the aperture or apertures are created.

In terms of complexity, weight and aerodynamic drag, the translational nozzle system is the least penalizing system that can be integrated in an engine with high bypass ratio. In fact, by using this system, the kinematics of the nozzle are reduced to simple translation of the rear part of the nacelle along the engine axis. In addition, the aerodynamic flows inside and outside the nacelle are only slightly perturbed in collapsed position.

Another object of the invention is an aircraft comprising at least two engine nacelles, each nacelle being in conformity with at least one of the aspects of the nacelle described briefly hereinabove.

Other characteristics and advantages will become apparent from the description hereinafter, which is provided solely by way of non-limitative example and is written with reference to the attached drawings, wherein.

Figure 1:
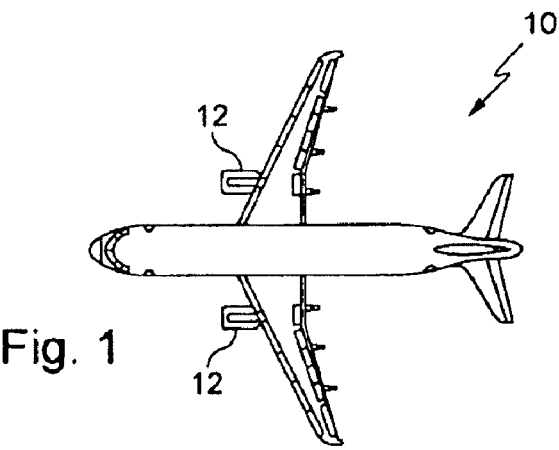
FIG. 1 is a schematic general view of an aircraft according to the invention.

As represented in FIG. 1 and denoted in general by reference marked 10, a commercial aircraft (airliner) is equipped with a plurality of engine nacelles 12 fixed under the main wing of the aircraft.

Aircraft 10, for example, has two engine nacelles, each fixed on one of the side wings, although it is possible, depending on the aircraft models, for a plurality of nacelles to be fixed to the same wing.

Furthermore, it is possible to envision fixing the engine nacelles directly on the fuselage, either on both sides of the fuselage or on the rear upper part of the fuselage.

Figure 2:
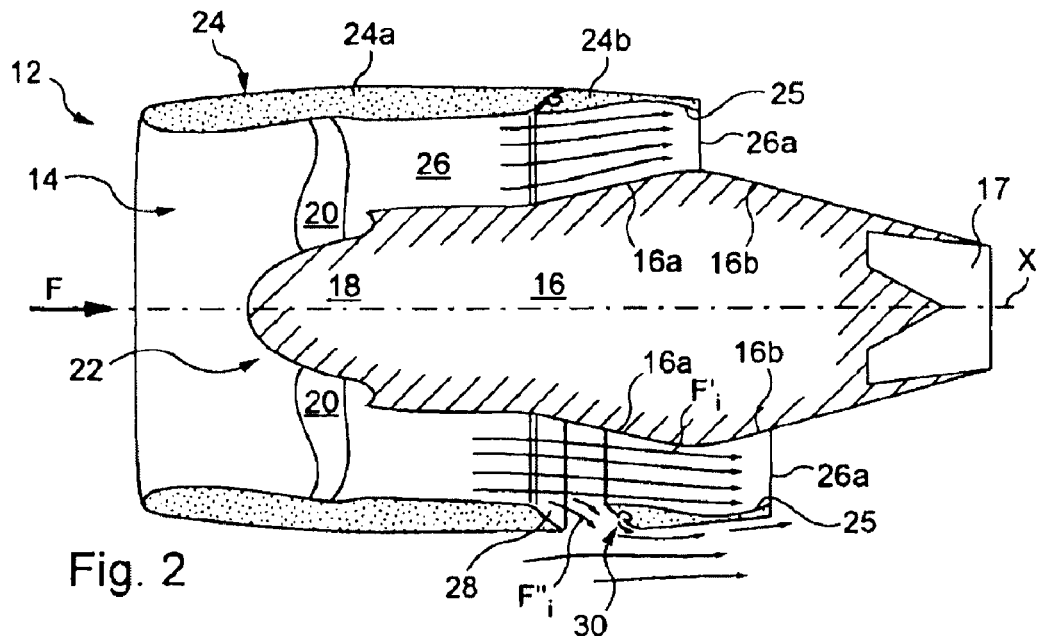
FIG. 2 is a schematic view in longitudinal section of an aircraft nacelle according to a first embodiment of the invention.

As represented in FIG. 2, one of the nacelles 12 according to the invention is schematically illustrated in longitudinal section.

An engine 14 having longitudinal axis X and installed inside the nacelle comprises a turbojet 16 equipped at the inlet, on the upstream side (at the left in the figure), with a shaft 18 on which there are mounted the blades 20 of a fan 22. The turbojet is of the dual-flow type with high bypass ratio (ratio greater than or equal to 5).

It will be noted that the invention is also applicable to turbojets having a very high bypass ratio (close to 10).

Nacelle 12 surrounds the upstream part of the aforesaid engine 14, while the downstream part thereof projects beyond the downstream part of the nacelle, as represented partly in FIG. 2.

More particularly, nacelle 12 is provided with a wall 24 that concentrically surrounds the engine in such a way as to define therewith an annular conduit 26, in which there flows a fluid, which in the present case is air.

As represented in FIG. 2, air symbolized by arrow F arriving at the inlet of the nacelle penetrates to the interior thereof, and a first stream known as the primary stream penetrates into turbojet 16 to participate in combustion and to drive shaft 18 and therefore fan 22 in rotation. This primary stream is then ejected via nozzle 17 of the engine, thus contributing to part of the thrust of the turbojet.

A second air stream known as the secondary stream, propelled by the fan, follows annular conduit 26 and escapes via downstream part 26a of the nacelle, thus constituting the major part of the thrust of the propulsion system.

It should be noted that wall 24 of the nacelle is made in two parts: an upstream part 24a forming the aerodynamic fairing of the front part of the turbojet, and a downstream part 24b that includes the trailing edge of the nacelle wall and that is mobile in longitudinal translation (along direction X) relative to the first fixed part.

As shown on FIG. 2, second part 24b is represented in the top part of this figure, in a first so-called collapsed position and for which the internal flow Fi to annular conduit 26 traverses the latter to its downstream discharging end 26a. This position is used in flying phases in which the invention is not employed.

It will be noted that turbojet 16 has an external surface 16a, whose diameter increases as it advances along conduit 26 as far as downstream end 26a (top part of FIG. 2). The shape of external surface 16a of the turbojet resembles a cone portion (frustoconical), whose apex is situated toward upstream.

The internal surface of downstream part 24b in turn exhibits a decrease of diameter along the conduit in the part close to downstream end 26a and as far as the latter. The shape of this part 25 of the internal surface resembles a cone portion whose apex is situated toward downstream.

Downstream part 24b of the nacelle wall is displaced on command (for example on the basis of a signal sent from the flight deck), in continuous or discontinuous translational movement (for example, under the action of hydraulic actuators mounted in part 24a of the wall, parallel to axis X), from the first collapsed position to a second position, said to be deployed, represented in the bottom part of FIG. 2.

In the second, deployed position, a radial or annular aperture 28 is created in wall 24. This aperture is positioned between upstream and downstream parts 24a and 24b respectively on the external periphery of annular conduit 26.

It should be noted that downstream part 24b of the nacelle wall may be composed of a plurality of semi-annular portions (in the form of annulus portions), which can be joined together to form a complete annulus and which can each be displaced independently.

The displacement of each semi-annular portion toward downstream thus creates a different semi-annular aperture in the nacelle wall.

The purpose of this displacement is to vary the outlet passage cross section for the flow inside the nozzle defined by the internal face of downstream wall 24b and the external face of turbojet 16 facing it.

Thus, when downstream part 24b is displaced toward the rear, the outlet passage cross section for the fluid flow at downstream end 26a is increased: a diverging nozzle is formed between part 25 of the internal surface of downstream wall 24b and zone 16b of the external surface of the turbojet situated downstream from the region of maximum diameter. This causes a variation of the expansion ratio of the flow F'i, thus inducing a maximum thrust P.

It will be noted that upstream part 24*a* and downstream part 24*b* of the nacelle wall have complementary shapes at their end zones intended to come into contact with one another, in order that the assembly composed of the two parts will be contiguous when they are in contact with one another (top part of FIG. 2).

Figure 3:
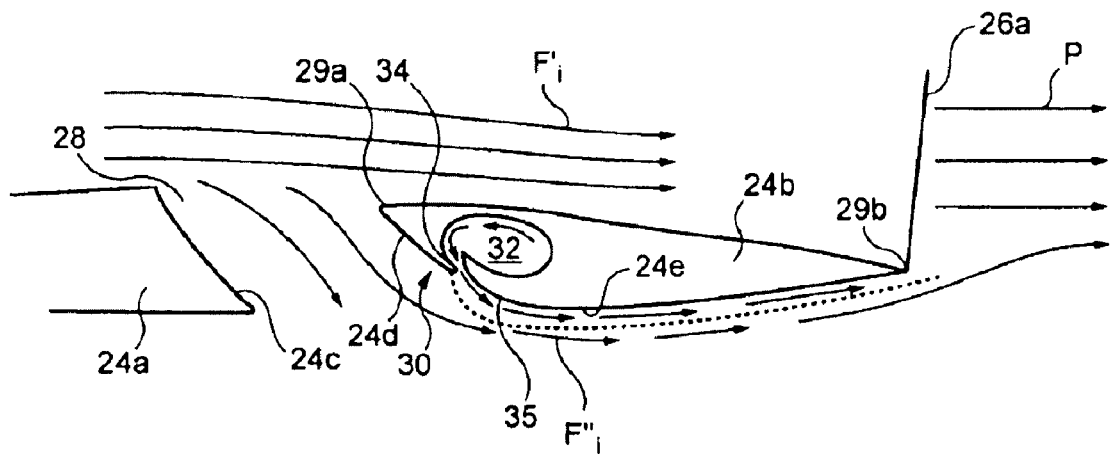
FIG. 3 is an enlarged partial schematic view of fluid-control device 30 of FIG. 2.

At their facing end zones, therefore, the two parts 24*a* and 24*b* have two respective inclined faces, each having substantially chamfered shape: end surface 24*c* of front part 24*a* is inclined toward the interior of the annular conduit, while end surface 24*d* of downstream part 24*b* is inclined toward the exterior of the nacelle (FIGS. 2 and 3).

As represented at the bottom part of FIG. 2 and in FIG. 3, when the two end faces 24*c* and 24*d* are disconnected, they form the edges of aperture 28.

End face 24*d* merges into external face 24*e* of downstream part 24*b* in the region of the junction between the two parts 24*a* and 24*b*.

It will be noted that downstream part 24*b* has an aerodynamically profiled tip 29*a*, which forms a leading edge situated downstream from aperture 28.

Beginning from this leading edge, downstream part 24*b* broadens toward downstream then narrows as it approaches a tapered tip 29*b*, opposite edge 29*a* and which forms a trailing edge.

Furthermore, a small part of the internal flow of the fluid circulating in conduit 26 is able to escape naturally in radial manner via this aperture.

This flow fraction is known as leakage flow and is denoted by Fi".

A fluid-control device 30 is provided in the nacelle wall to control this leakage flow Fi".

As represented in FIG. 2 (and in more detailed manner in FIG. 3), fluid-control device 30 is mounted, for example, in mobile part 24*b* of the nacelle wall, at the junction zone between parts 24*a* and 24*b*.

Device 30 is mounted on external face 24*e* of downstream part 24*b* of the nacelle wall and more particularly on end face 24*d*.

Device 30 is provided with means that permit it to inject a high-energy fluid into the leakage flow Fi" when the mobile element or elements of the nacelle are displaced to bring about a variation of cross section of the variable cross section nozzle.

This injection of fluid is performed substantially tangential to external face 24*e* of downstream part 24*b*.

More particularly, fluid-control device 30 is provided in the thickest part of downstream part 24*b* with a supply duct for high-energy fluid, which is, for example, pressurized air arriving from the engine.

This fluid supply duct has a part, not illustrated, that communicates with the pressurized air source of turbojet 16 or with an auxiliary generator of pneumatic energy (such as a compressor).

The duct also has an annular part 32 partly represented in section in FIG. 2. This duct 32 extends to the periphery of aperture 28 and is constructed in the form of one or more torus arcs or even as a complete torus mounted on external face 24*e* of the rear part of the nacelle wall.

Fluid-control device 30 is additionally provided with one or more injection nozzles 34, which communicate with duct 32 and discharge onto external face 24*e*, thus making it possible to inject the high-energy fluid into the leakage flow Fi" (FIG. 3).

A curved surface 35 is arranged at the outlet of injection nozzle 34, tangentially thereto.

It will be noted that, when the duct is constructed in the form of toroidal sections (torus arcs) or even of a complete torus, the nozzle may have the form of a slit and extend along the entire length of the torus section (nozzle of semi-annular form) or of the complete torus (nozzle of annular form).

For a same torus section or for the complete torus, it is also possible to have a plurality of separate injection nozzles distributed over the section under consideration or over the torus.

As represented in FIGS. 2 and 3, the pressurized fluid being transported via duct 32 is introduced in the form of a jet into leakage flow Fi" via injection nozzle 34, tangentially to external face 24*e*, in this way modifying a fraction of this flow or even the entire flow in controlled manner.

The jet injected in this way exits the nozzle with a given orientation, tangentially to curved surface 35, then assumes the shape of this surface (FIG. 3), to the extent that the centrifugal force tending to detach it is balanced by the reduced pressure developed between the wall and the jet.

As represented in FIG. 3, a large part of the leakage flow Fi" is diverted from its trajectory under the action of the jet injected through injection nozzle 34, which is itself diverted by surface 35.

The energy input by the fluid injected via injection nozzle 34 makes it possible to control the direction of the injected fluid jet.

The orientation of the jet varies as a function of at least one of the thermodynamic and aerodynamic parameters of the fluid, namely, for example, the pressure and/or the temperature and/or the flowrate and/or the velocity and/or the turbulence ratio, etc.

The fluid jet injected via the fluid-control device makes it possible to control the leakage flow Fi" by aerodynamic induction, directing it along external face 24*e*, as represented in FIG. 3, thus avoiding the detachment phenomena that tend to generate drag.

The flow Fi", in this way reoriented substantially parallel to the thrust vector P of the turbojet, follows external face 24*e* of downstream part 24*b* and, downstream from trailing edge 29*b*, rejoins flow F'i, which constitutes the thrust vector.

In this way, the invention makes it possible to amplify the direct jet thrust by reusing all or part of the leakage flow, which would normally be lost in the absence of the invention. Thus the undesirable flows are greatly limited in particularly simple and efficient manner.

This advantageous contribution of the leakage flow to the total balance of thrust of the engine makes it possible to increase the general propulsive efficiency of the translationally variable nozzle.

As an example, when a high flowrate and a high pressure of the inducing fluid are chosen, the fluid jet adheres to surface 35 and in general to the entirety or almost the entirety of external face 24*e*, and so the leakage flow Fi" is diverted in the downstream of the nacelle.

It will be noted that it is possible to modify a single one of the thermodynamic and aerodynamic parameters, for example the flowrate, in order to act on the leakage flow, both to control the orientation of that flow and the amount of flow being acted on.

By varying the size of the injection orifice at the outlet of the injection nozzle, for example by an arrangement of diaphragm type, it is possible to vary the injection velocity and thus the flowrate of injected fluid.

Furthermore, when the fluid-control device is activated, the injection of fluid can be achieved either in a continuous stream or in a pulsed stream, to limit the consumption of injected fluid.

It should be noted that the aerodynamic forces associated with the operation of the device according to the invention are concentrated mainly on fluid-control device 30 mounted in annular manner on the nacelle wall, thus making it possible to improve the distribution of forces to be transmitted within the nacelle structure and thus to optimize the geometry and weight of the nacelle structure.

Furthermore, the integration of the fluid-control device on the nacelle wall has only very little influence on the internal and external acoustic treatment thereof.

In fact, in the collapsed position represented in the top part of FIG. 2, the device according to the invention permits the integration of an acoustic parietal lining over almost the entirety of the internal and external faces of the nacelle wall.

In addition, the size of fluid-control device 30 is relatively small, thus facilitating its integration into the said wall.

Figure 4:
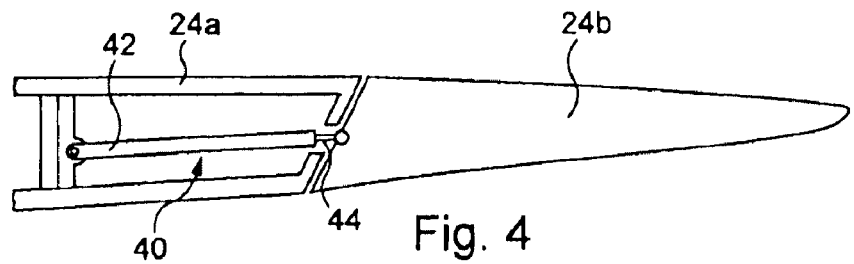
FIGS. 4 and 5 are partial schematic views of a mechanism for displacement of the rear part of the nacelle wall in collapsed and extended positions respectively.

An embodiment of a means for translational displacement of rear part 24b of the nacelle wall has been represented in FIG. 4.

An internal pocket formed in upstream part 24a receives a double-effect actuator 40, for example of pneumatic or hydraulic type.

Fixed part 42, or body of the actuator, is secured to the bottom of the pocket, while mobile part 44, or rod of the actuator, is fixed to rear part 24b, in a zone in which fluid-control device 30 is not present.

It is nevertheless possible to envision a fixation even if device 30 extends over the entire periphery of rear part 24b.

In this figure, rear part 24b is not translated and is mounted against front part 24a in collapsed position (actuator retracted).

Figure 5:
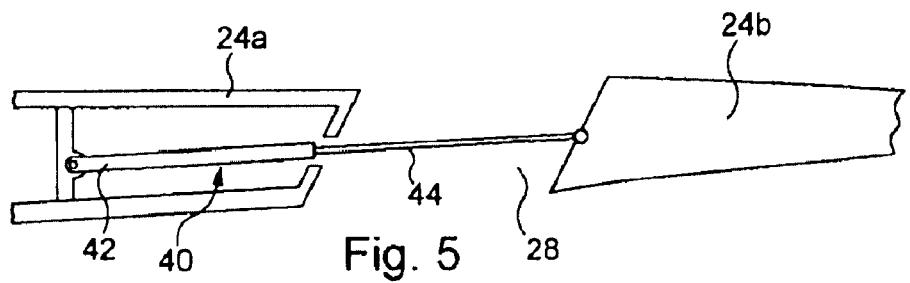

In FIG. 5, the outward movement of rod 44 of the actuator is commanded and rear part 24b is deployed, thus creating aperture 28 in the nacelle wall, starting from the junction between upstream and downstream parts 24a and 24b respectively.

It will be noted that a plurality of actuators of this type are, for example, arranged around the circumference of upstream wall part 24a in order to translate the rear part effectively.

The invention is also applicable to turbojets of high or very high bypass ratio equipped with variable cross section nozzles that are not of the translation type.

It will be noted that a variable cross section nozzle used as equipment of such turbojets makes it possible to adapt to the different phases of operation of the airplane (cruising flight, low speed).

Figure 6:
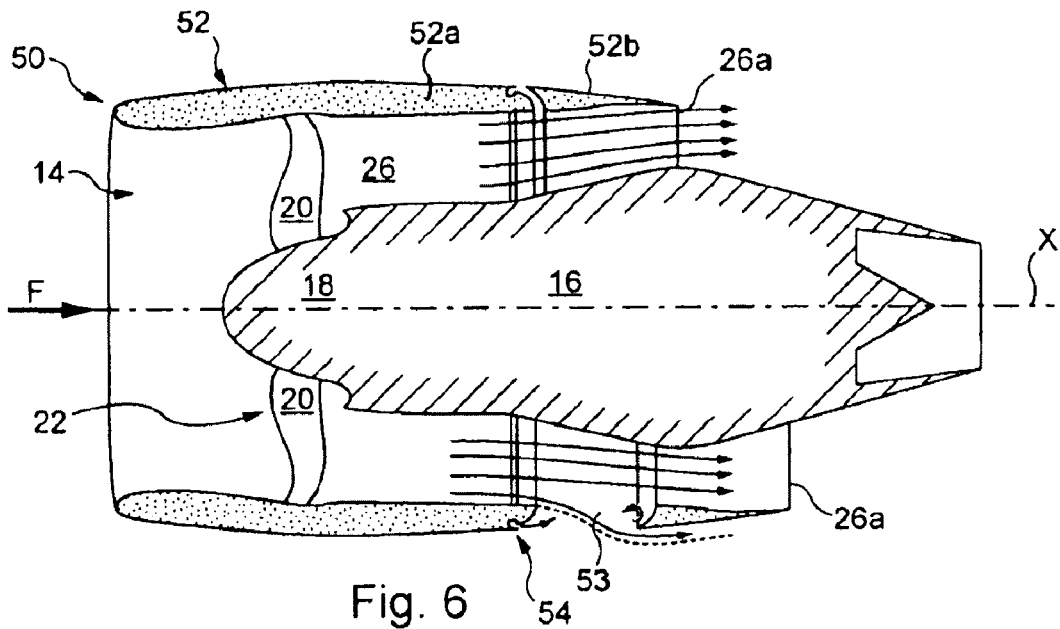
FIG. 6 represents a schematic view in longitudinal section of an aircraft engine nacelle according to a second embodiment of the invention.
Figure 7:
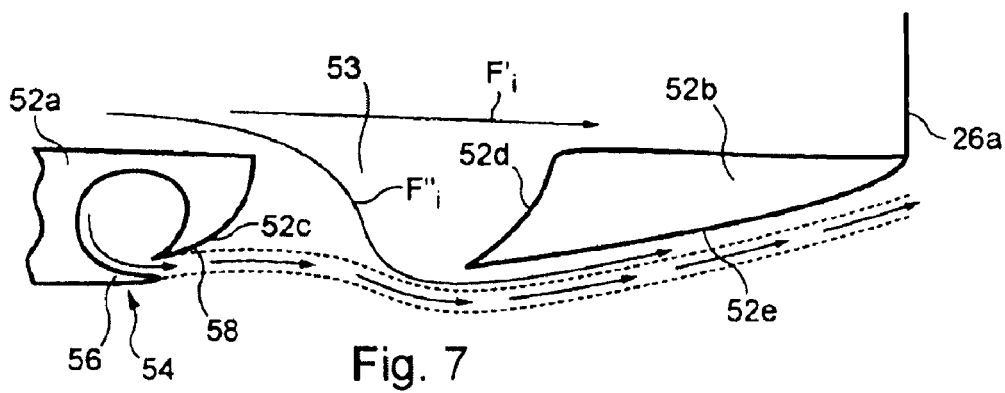
FIG. 7 is an enlarged schematic view of a part of FIG. 6.

Nacelle 50 of FIGS. 6 and 7 illustrates another embodiment of the invention, in which elements left unchanged compared with nacelle 12 of FIG. 2 retain the same references.

Nacelle 50 differs from nacelle 12 on the one hand by the positioning of the fluid-control device upstream from the junction zone between the upstream and downstream parts of the nacelle wall and on the other hand by the shape of the facing end faces of these parts.

As represented in FIGS. 6 and 7, nacelle wall 52 has an upstream part 52a, whose end face 52c is convex and turned toward the exterior of the nacelle, and a downstream part 52b, whose end face is concave and turned toward annular conduit 26.

When the two parts are separated from one another, one or more radial apertures 53 is or are therefore formed between them.

Fluid-control device 54 is housed in upstream part 52a (upstream from the aperture), and injection means 56 (injection nozzle) are disposed on the external face of the upstream part of the nacelle wall. More particularly, means 56 are provided on end face 52c, which merges with the external face of front part 52a at the junction zone between parts 52a and 52b.

The high-energy fluid jet injected by nozzle 56 follows curved surface 58 in a manner tangential to the discharging end of this nozzle, for a greater or lesser distance, according to the desired aerodynamic induction effect.

Depending on the energy of the injected fluid (this energy is adjusted by virtue of the chosen value of at least one of the thermodynamic and aerodynamic parameters of the fluid), it is possible to control this distance and therefore the position of the point of curved surface 58 at which the jet separates from this surface.

In this way the direction of the fluid jet is controlled.

In the configuration of FIGS. 6 and 7, this distance is short and the jet detaches very rapidly from the surface to rejoin the leakage flow Fi" and modify the trajectory thereof.

Thus the fluid jet oriented in controlled manner diverts the direction of the flow Fi" in equally controlled manner and forces it to follow end face 52e of downstream part 52b of the nacelle wall.

In this way the leakage flow is channeled along this face, parallel to the thrust vector of the turbojet, and reinjected, downstream from end 26a, into the flow F'i, which constitutes the thrust.

The integration of variable nozzle systems in turbojets with high bypass ratio significantly improves the thermodynamic performances thereof.

In fact, in the case of turbojets installed in airliners and having very high bypass ratios (close to 10), the compression ratio of the fan, the main contributor to the total thrust of the turbojet, is low (around 1.4). There is achieved an increase of the sensitivity of the aerodynamic performances of this fan with respect to the flying speed of the airplane (sonic speed).

In the case of a turbojet having a very high bypass ratio but not equipped with a variable nozzle system, the choice of the aerodynamic operating characteristic of the fan is a compromise between the aerodynamic efficiency in cruising flight and the surge margin (unsteady phenomena that may jeopardize engine integrity) at low flying speeds.

In the case of a turbojet having a very high bypass ratio and now equipped with a variable nozzle system, such a compromise is rendered unnecessary by virtue of the adaptation of the outlet cross section of the nozzle to the operating speed of the fan. The efficiency of the fan is then increased in each flying phase.

The invention claimed is:

1. An aircraft engine nacelle having a high bypass ratio, wherein there is installed an engine with a longitudinal axis, the nacelle comprising:
   a wall that concentrically surrounds the engine at least partly and that defines therewith an annular internal fluid flow conduit, which at a downstream end of the nacelle wall includes a flow-outlet passage cross section;
   means for displacement, on command, of a part of the nacelle wall to vary a flow-outlet passage cross section via which a major part of the flow escapes, this displacement creating, in the nacelle wall, at least one aperture via which there naturally escapes a leakage flow part of the flow; and
   a fluid-control device that causes a fluid to force the leakage flow to pass along the external face of the part of the nacelle wall situated downstream from the at least one aperture.

2. A nacelle according to claim 1, wherein the fluid-control device includes means for injection of a high-energy fluid into the leakage flow.

3. A nacelle according to claim 2, wherein the injection means includes at least one nozzle for injecting a high-energy fluid into the leakage flow.

4. A nacelle according to claim 3, wherein the at least one injection nozzle has an annular or semi-annular shape.

5. A nacelle according to claim 3, wherein the at least one injection nozzle communicates with a fluid supply duct that is arranged at least partly in the nacelle wall.

6. A nacelle according to claim 2, wherein the injection of a high-energy fluid into the leakage flow is effected in a continuous or pulsed manner.

7. A nacelle according to claim 2, wherein the fluid-control device includes a curved surface, disposed tangentially at a discharging end of the injection means, in such a way as to direct the leakage flow along the external face of the downstream part of the nacelle wall.

8. A nacelle according to claim 2, wherein the injection means is mounted on the external face of the nacelle wall.

9. A nacelle according to claim 1, wherein the fluid-control device is mounted upstream from the at least one aperture.

10. A nacelle according to claim 1, wherein the fluid-control device is mounted downstream from the at least one aperture.

11. A nacelle according to claim 1, wherein the part of the nacelle wall situated downstream from the at least one aperture comprises a profiled leading edge.

12. A nacelle according to claim 1, wherein at an interior of the annular conduit, the engine has an external face and the displaceable part of the nacelle wall has an internal face, that cooperate with one another to cause variation of the flow-outlet passage cross section when the wall part is displaced.

13. A nacelle according to claim 1, wherein the displaceable part of the nacelle wall is a downstream part of the nacelle wall that includes the trailing edge thereof and that is capable of being displaced longitudinally along the annular conduit, by translation in the downstream direction, between a first position in which no aperture is created, and a second position in which the aperture or apertures are created.

14. An aircraft comprising:
   at least two engine nacelles, each nacelle being an engine nacelle according to claim 1.

* * * * *